United States Patent
Mao et al.

(10) Patent No.: US 12,248,818 B1
(45) Date of Patent: Mar. 11, 2025

(54) REDUCING CLUSTER START UP TIME

(71) Applicant: Databricks, Inc., San Francisco, CA (US)

(72) Inventors: Yandong Mao, Millbrae, CA (US); Aaron Daniel Davidson, Berkeley, CA (US)

(73) Assignee: Databricks, Inc., San Francisco, CA (US)

( * ) Notice: Subject to any disclaimer, the term of this patent is extended or adjusted under 35 U.S.C. 154(b) by 657 days.

(21) Appl. No.: 17/514,988

(22) Filed: Oct. 29, 2021

Related U.S. Application Data

(60) Provisional application No. 63/191,662, filed on May 21, 2021.

(51) Int. Cl.
G06F 9/50 (2006.01)
G06F 21/45 (2013.01)

(52) U.S. Cl.
CPC ............ *G06F 9/5077* (2013.01); *G06F 21/45* (2013.01); *G06F 2209/5011* (2013.01); *G06F 2209/505* (2013.01)

(58) Field of Classification Search
CPC ...... G06F 9/5077; G06F 9/5072; G06F 9/455; G06F 9/45558; G06F 9/45537; G06F 2009/45562; G06F 2009/4557; G06F 2009/45575; G06F 2209/5011; G06F 2209/505
See application file for complete search history.

(56) References Cited

U.S. PATENT DOCUMENTS

| | | | | |
|---|---|---|---|---|
| 9,489,510 | B1 * | 11/2016 | Scott | .......................... H04L 9/30 |
| 9,531,715 | B1 * | 12/2016 | Rodgers | .............. H04L 63/1466 |
| 9,847,983 | B1 * | 12/2017 | Roth | ....................... H04L 63/08 |
| 10,362,092 | B1 | 7/2019 | Parthasarathy | |
| 11,550,945 | B2 * | 1/2023 | Sislow | ................ G06F 21/6254 |
| 11,652,720 | B2 * | 5/2023 | Zhou | ..................... H04L 47/788 718/104 |
| 2005/0262181 | A1 | 11/2005 | Schmidt et al. | |
| 2009/0204960 | A1 * | 8/2009 | Ben-Yehuda | ....... G06F 9/45558 718/1 |

(Continued)

OTHER PUBLICATIONS

United States Office Action, U.S. Appl. No. 18/162,546, filed Mar. 27, 2024, 18 pages.

(Continued)

*Primary Examiner* — Hiren P Patel
(74) *Attorney, Agent, or Firm* — Fenwick & West LLP

(57) ABSTRACT

The present application discloses a method, system, and computer system for starting up and maintaining a cluster in a warmed up state, and/or allocating clusters from a warmed up state. The method includes instantiating a set of virtual machines, wherein instantiating the set of virtual machines includes setting a temporary security credential for each virtual machine of the set of virtual machines, receiving a virtual machine allocation request associated with a workspace, a customer, or a tenant, in response to the virtual machine allocation request: allocating a virtual machine, wherein allocating the virtual machine comprises replacing the temporary security credential with a security credential associated with the workspace, the customer, or the tenant.

22 Claims, 7 Drawing Sheets

(56) References Cited

U.S. PATENT DOCUMENTS

| | | | |
|---|---|---|---|
| 2013/0014101 A1* | 1/2013 | Ballani | G06F 9/45533 |
| | | | 718/1 |
| 2013/0227710 A1 | 8/2013 | Barak et al. | |
| 2014/0189685 A1 | 7/2014 | Kripalani | |
| 2015/0120928 A1* | 4/2015 | Gummaraju | H04L 67/1008 |
| | | | 718/1 |
| 2015/0261557 A1 | 9/2015 | Ashok et al. | |
| 2015/0261561 A1 | 9/2015 | Ashok et al. | |
| 2016/0026798 A1* | 1/2016 | Martini | G06F 21/552 |
| | | | 726/1 |
| 2016/0077919 A1* | 3/2016 | Duggan | G06F 11/2023 |
| | | | 714/15 |
| 2016/0224785 A1 | 8/2016 | Wagner et al. | |
| 2016/0277508 A1 | 9/2016 | Byskal et al. | |
| 2017/0185438 A1 | 6/2017 | Thomas et al. | |
| 2017/0279826 A1* | 9/2017 | Mohanty | G06F 9/505 |
| 2018/0004575 A1 | 1/2018 | Marriner et al. | |
| 2018/0225149 A1* | 8/2018 | Bianchini | G06F 9/45558 |
| 2019/0278620 A1* | 9/2019 | Korbar | G06F 9/45558 |
| 2019/0297112 A1* | 9/2019 | Yu | H04L 63/18 |
| 2020/0034245 A1 | 1/2020 | Kohler | |
| 2021/0141657 A1* | 5/2021 | Pearson | G06F 9/4451 |
| 2021/0216352 A1 | 7/2021 | Kripalani | |
| 2021/0286891 A1* | 9/2021 | Sislow | G06F 16/2379 |
| 2022/0150322 A1 | 5/2022 | Ikeda | |
| 2022/0283964 A1* | 9/2022 | Burstein | G06F 13/4221 |
| 2023/0107104 A1* | 4/2023 | Nash | G06F 21/53 |
| | | | 726/1 |
| 2023/0188516 A1* | 6/2023 | Danilov | G06F 9/5072 |
| | | | 726/7 |

OTHER PUBLICATIONS

United States Office Action, U.S. Appl. No. 18/162,546, filed Aug. 1, 2024, 21 pages.

* cited by examiner

REDUCING CLUSTER START UP TIME

CROSS REFERENCE TO OTHER APPLICATIONS

This application claims priority to U.S. Provisional Patent Application No. 63/191,662 entitled REDUCING CLUSTER PROCESSING START UP TIME filed May 21, 2021 which is incorporated herein by reference for all purposes.

BACKGROUND OF THE INVENTION

A system for big data processing comprises a system for deployments of applications, configurations, one or more datasets, and model(s) used in connection with analyzing the data. Various cloud services deploy clusters to store and process data, to process queries, and to provide services to various users. As the cloud service scales the processing requirements exceed that capacity for the currently deployed clusters to service such requirements in a manner that provides a certain quality of service. Accordingly, as processing requirements scale, there is a need to deploy additional clusters to provide the associated services. However, the start up time for a cluster is generally on the order of minutes. A cloud service may thus have to provide a service below an expected quality of service threshold for a relatively extended time while waiting for starting up and deployment of a cluster. This creates a problem for providing cloud services in near real-time.

BRIEF DESCRIPTION OF THE DRAWINGS

Various embodiments of the invention are disclosed in the following detailed description and the accompanying drawings.

DETAILED DESCRIPTION

Figure 1:
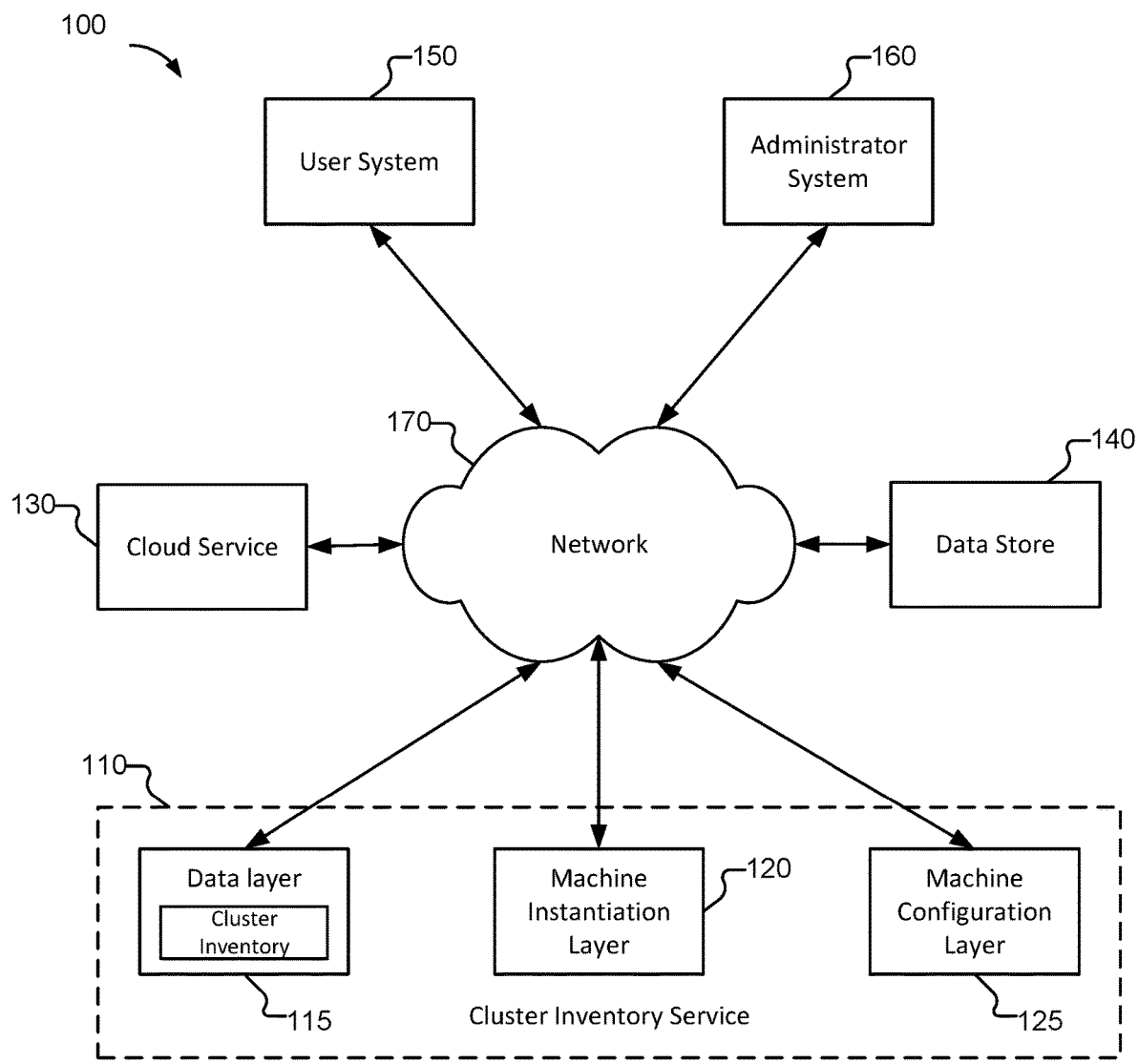
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a cluster refers to a set of connected nodes (e.g., computers, virtual machines, etc.) that work together. As an example, each node runs its own instance of an operating system.

According to various embodiments, a system, method, and/or device for warming up virtual machines or clusters and allocating the virtual machines or clusters to customers (e.g., to customer deployments) is disclosed. The system comprises one or more processors and a memory. The one or more processors are configured to instantiate a set of virtual machines in one or more clusters, wherein instantiating the set of virtual machines includes setting a temporary security credential for each virtual machine of the set of virtual machines, receive a virtual machine allocation request associated with a customer, and in response to the virtual machine allocation request: allocate a virtual machine, wherein allocating the virtual machine comprises replacing the temporary security credential with a security credential associated with the customer.

Various embodiments provide a system, method, and device for rapid start up/deployment of clusters. In some embodiments, a plurality of virtual machines is maintained for rapid start up/deployment. In some embodiments, the virtual machines are organized or sorted. In some embodiments, the virtual machines are maintained in a single pool of available machines. In some embodiments, the virtual machines are organized into a plurality of cluster pools. In some embodiments, a plurality of cluster pools are maintained (e.g., by a cluster inventory service) such that a cluster pool may be allocated from one of the cluster pools in response to a determination that a customer deployment (e.g., an instance for a customer) is requesting or needs a cluster. According to various embodiments, the plurality of cluster pools is used to serve a plurality of environments and/or a plurality of tenants or customers. For example, a cluster in one of the plurality of cluster pools is maintained in a manner that the configurations are agnostic with respect to the customer or tenant to whom the cluster is allocated and/or deployed. In response to determination that the cluster is to be allocated to a particular customer or tenant, the cluster is configured based at least in part on configurations pertaining to the cluster or tenant (e.g., a tenant associated with the cluster). In some embodiments, a plurality of customers and/or tenants may request, and have allocated, a cluster from the plurality of cluster pools being maintained by the system. In some embodiments, maintaining the plurality of cluster pools includes starting up a cluster (e.g., for one of the plurality of cluster pools), configuring (e.g., provisioning) the cluster, and keeping the cluster running and ready for deployment. In some embodiments, a cluster is maintained in a cluster pool until the system receives an allocation request (e.g., by a customer system or a tenant associated with a customer) or until a determination to terminate the cluster such as because the number of clusters or virtual machines being maintained exceeds a predicted usage or exceeds the predicted usage by a predefined threshold value (e.g., if the number of clusters being maintained exceeds the predicted usage by 5%, 10%, 25%, etc.). The predefined threshold value is configurable such as by an administrator of the system or an administrator of a customer system. As another example, the predefined threshold value is configured or determined based at least in part on a variance of the predicted usage.

According to various embodiments, the system maintains a cluster pool comprising a plurality of clusters. A cluster within the cluster pool is maintained in a warmed up state and is deployed to a workspace, tenant, or customer system associated with the customer in response to an allocation request (e.g., a virtual machine allocation request). In some embodiments, a cluster comprised in the cluster pool is deployed and ready to run a query (e.g., a database query, SQL query, etc.) quickly (e.g., more rapidly than a cold boot which is typically about 5 minutes—for example, in less than 10 seconds) from the time at which the allocation request is received. When a customer (or a customer system) wants a cluster, the customer generally requires the cluster to scale up quickly such as to service contemporaneous queries received by the customer system. In connection with reducing the deployment time of a cluster (or virtual machine) to a customer system, a virtual machine comprised in the cluster allocated to the customer system is preloaded with components that are used or needed at runtime. For example, the virtual machine may be preloaded with all components needed at runtime. In some embodiments, the clusters comprised in a cluster pool being maintained by the system are configured (e.g., provisioned or preloaded with components) in a manner that the cluster is extensible to various customers or for various requirements within a given customers (e.g., the base cluster is same across many customers whereas a particular customer might want to add components 1 and 3 and another customer might want to add components 2, 3, and 4). For example, the cluster is maintained in the cluster pool in a manner that the configuration of the cluster is agnostic to the specific customer to whom the cluster is eventually allocated (e.g., after allocation the cluster is configured using various customer-specific configurations) or agnostic to a specific use case or configuration. As another example, the cluster is maintained in the cluster pool in a manner that the configuration of the cluster is agnostic to the specific customer to which the cluster is eventually allocated at least with respect to a same class of cluster/environment in which the cluster is allocable. In related art systems, a virtual machine is warmed up in a state according to which the machine is configured specifically for the environment or system to which the machine will be deployed. Accordingly, related art systems for warming up a virtual machine are not suitable for multi-tenant environments or multi-workspace environments.

In some embodiments, the system comprises a plurality of cluster pools (e.g., a cluster pool with driver nodes and worker nodes, a cluster pool with only driver nodes, a cluster with only worker nodes, etc.). The plurality of cluster pools may comprise a subset of pools comprising clusters of driver nodes (or driver virtual machine), and a cluster pool comprising one or more clusters comprising worker nodes (e.g., a worker pool comprises only worker nodes). According to various embodiments, each of the pools in the subset of cluster pools comprises clusters of a particular class of driver (e.g., a driver node) or just a general specific class of machine. As an example, the system may comprise a set of classes of environments (e.g., operating environment to which a node is deployed), and each class of environment can have certain processing or memory requirements. The system comprises a class of driver corresponding to a class of environment (e.g., for each class of environment the system comprises a predefined class of driver).

In some embodiments, the system (e.g., the cluster inventory service) starts up and maintains clusters (or virtual machines) based at least in part on a predicted usage. The predicted usage may correspond to an expected demand for clusters such as a cluster corresponding to a particular environment (e.g., a driver cluster). For example, the system may maintain a plurality of cluster pools, and each of the cluster pools may comprise one or more clusters of a particular class configured for a particular environment (e.g., a class of driver cluster). As an example, each environment may have its own specific configurations such as memory and/or processing requirements. As another example, each cluster within a particular cluster pool corresponds to a same class that is associated with a particular environment (e.g., a type or class of environment). According to various embodiments, the system uses a machine learning process to determine the predicted usage (e.g., a predicted usage for a particular class of cluster, etc.). In response to determining the predicted usage, the system uses the predicted usage in connection with determining an amount of clusters (e.g., an amount of a particular type of cluster) to maintain. For example, the system uses the predicted usage to determine whether to start up a new cluster and/or whether to terminate a cluster. In some embodiments, the system uses a predicted usage in connection with determining the size of a pool comprising worker nodes, such as determining a number of worker nodes comprised in the worker pool.

According to various embodiments, the provisioning of a cluster comprised in a cluster pool comprises using a placeholder security credential. As an example, the placeholder security credential corresponds to a dummy or temporary security credential. In some embodiments, the dummy comprises a null credential. The security credential (e.g., the placeholder security credential, or a customer-specific or tenant-specific security credential when the placeholder security credential is replaced) may be a token. For example, the security credential may be an alphanumeric string. In some embodiments, the placeholder security credential is inserted into the Identity and Access Management (IAM) role or field associated with the cluster. The placeholder security credential corresponds to a security credential that is agnostic with respect to the customer or tenant (e.g., the placeholder security credential does not provide authentication to any particular customer system). Generally, when a system warms up a cluster, the system is required to insert a security credential. In related art systems, the security credential is set to be the security credential for that specific customer or tenant for whom the cluster is being instantiated or for a given workspace so that two workspaces cannot interact. However, in various embodiments in which clusters are to be warmed up and maintained in a cluster pool that provides clusters to various workspaces, tenants, or customer, the security credential used in a cluster within a cluster pool is agnostic (e.g., while the cluster is within the cluster pool, before allocation of the cluster, etc.) with respect to the customer or tenant. Accordingly, the cluster can be allocated to various customers or tenants; upon allocation of the cluster to a workspace, tenant, or customer system, the security credential of the cluster is replaced with a security credential for the customer or tenant to which the cluster is being allocated (e.g., thereby enabling the cluster to be authenticated with respect to the customer or tenant). In some embodiments, in response to a determination that the cluster is to be allocated, the cluster is configured (e.g., updated) to comprise a credential (e.g., a token, a secret, etc.) to access storage associated with the workspace, tenant, or customer system to which the cluster is allocated. Before allocation of the cluster to a workspace, tenant, or customer system, the use of the placeholder security credential and the configuration to prevent a network connection among nodes within a cluster (e.g., the disabling or lack of enabling of network bindings, etc.) can cause the cluster to be within an untrusted subnetwork, thus even if a malicious party causes a container breakout, the cluster is configured to prevent communication or connection to trusted subnetworks within the system (e.g., trusted subnets of customer systems or tenants).

According to various embodiments, in connection with starting up a cluster, the system performs a security check with respect to the cluster and/or a virtual machine (e.g., a node) within the cluster. As an example, the security check may comprise determining (e.g., confirming) whether a connection setting for the cluster (or virtual machine or workspace) is set to be disconnected from infrastructures of other tenants or workspaces (e.g., tenants associated with a customer or workspaces associated with a user), is set to cause virtual machines within the cluster to be unable to communicate outside the virtual machine or container, and/or the cluster is set to be unable to communicate with other clusters. As an example, the security check may comprise determining whether a security credential comprised in the cluster is a placeholder security credential (e.g., token) such as a temporary or dummy security credential. The placeholder security credential may correspond to a security credential that is agnostic with respect to the customer or tenant or workspace to which the cluster is allocated and/or deployed. For example, the placeholder security credential does not provide access to a customer system or tenant or workspace associated with a customer system. According to various embodiments, the placeholder security credential is comprised in the IAM role or field associated with the cluster. In some embodiments, performing the security check comprises determining whether any cluster (or any machine within the cluster) has global permissions that enable the cluster to access information outside a workspace, a customer, or a tenant to which the cluster is (or is to be) deployed, or otherwise outside an environment or boundaries within which the cluster is to be accessing information.

In some embodiments, in connection with starting up a cluster, the system uses a placeholder customer resource definition (CRD). For example, the placeholder CRD is used until the cluster is allocated to a customer. As an example, in response to allocation of the cluster to a customer, the CRD of the cluster is updated to correspond to the customer CRD associated with the customer to which the cluster is allocated. For example, the placeholder CRD is replaced with a customer-specific CRD. In some embodiments, the placeholder CRD corresponds to a dummy or temporary CRD. The placeholder CRD corresponds to a CRD that is agnostic with respect to the customer or tenant. As an example, the CRD is a definition of a template or standard resource used by the customer (e.g., by the customer system). In some embodiments, each cluster has a CRD (e.g., each cluster has a single CRD).

According to various embodiments, the system determines that a cluster (or a virtual machine) is to be allocated to a customer (e.g., a workspace, tenant, or customer system associated with the customer). The system may determine that the cluster is to be allocated based at least in part a request from a workspace, a tenant, or a customer system and/or a monitoring of a performance of the workspace, the tenant, or the customer system. For example, the system may monitor processing times of queries at the customer system (e.g., by the clusters in the customer system), and determine that a cluster is to be allocated to the customer system (e.g., based on the monitored processing times). As an example, in response to a determination that the processing times at the customer system exceed a threshold processing time, the system determines to allocate one or more clusters to the customer system (e.g., a number of clusters to be allocated can be based on a number of clusters expected to reduce the processing times at the computer system to a time that is below a threshold processing time). As another example, in response to a determination that an average the processing time (e.g., over a predetermined period of time and/or across clusters) at the customer system exceeds a threshold processing time, the system determines to allocate one or more clusters to the customer system. In some embodiments, in response to determining that the cluster is to be allocated to the customer, the system determines a type of cluster (e.g., a particular class of driver, etc.) to be allocated to the customer. The system commits an allocation of a machine of the cluster or the cluster to the workspace, the tenant, or the customer. In response to, or in connection with, committing the allocation of the cluster, the system sends an update to the cluster. In some embodiments, the update to the cluster comprises a configuration that is used for the customer system (e.g., a customer-specific or tenant-specific configuration). The update to the cluster may be sent via an update to a CRD. According to various embodiments, the update to the cluster includes replacing the placeholder security credential with a security credential associated with the customer (e.g., a customer-specific or tenant-specific security credential). In response to allocation of the cluster, the system modifies the cluster at an infrastructure-level. For example, the system configures the cluster to connect a worker node comprised in the cluster to a driver node comprised in the cluster. As another example, the system connects the cluster (e.g., the nodes comprised within the cluster) to the customer infrastructure. For example, the system (e.g., the control plane of the system) may configure a network connection of the cluster to be able to communicate with the customer system. The system determines the allocated cluster to be ready to provide service on the customer system (e.g., to service queries, tasks, etc.) in response to a determination by the system (e.g., by the control plane of the system) that a single node or the driver node of the cluster is ready (e.g., initialized) and/or at least one worker node or no worker node or a minimum proportion of worker nodes is ready (e.g., initialized for the customer system).

According to various embodiments, a virtual machine is bound to a particular cluster. For example, the system associates a cluster identifier with the virtual machine, and the virtual machine carries the cluster identifier with the virtual machine through its lifetime. In some embodiments, the cluster identifier associated with the virtual machine is used to ensure that the virtual machine is not used by other clusters. For example, when assigning tasks or queries to virtual machines, the cluster (e.g., the driver node) ensures that only virtual machines comprising the cluster identifier associated with the cluster are used to process the tasks or queries. In some embodiments, the virtual machine is used not able to be used by multiple users at the same time.

According to various embodiments, in response to a determination that a customer system is finished using a cluster, the system determines whether to terminate the cluster or to repurpose the cluster. In some embodiments, in response to a determination to repurpose the cluster, the system cleans or deletes information comprised in the cluster such as to ensure that the cluster is secure and clean. For example, repurposing the cluster comprises cleaning the cluster and re-inserting the cluster into the cluster pool corresponding to an inventory of cluster pools (e.g., the cleaned cluster is re-allocated to the corresponding cluster pool). In some embodiments, the cluster is repurposed to a new use directly. The determination that the customer system is finished using the cluster may be based on an instruction provided by the customer system, or based on indication pertaining to a performance of the customer system (e.g., an indication of the customer system capacity, an indication of the customer system demands or requirements, or both, etc.). In response to determining to repurpose the cluster, the system removes data from the cluster (e.g., a worker node) and resets security settings of the cluster to disconnect the cluster from the customer system. As an example, the system configures dynamic security settings or configurations of the cluster to correspond to a cluster that is agnostic to a tenant or customer (e.g., a tenant or customer for which the cluster will be redeployed/reallocated). For example, the system removes a customer-specific (or tenant-specific) security credential (e.g., token) from the cluster being repurposed. The system may insert a placeholder security credential in place of a customer-specific security credential. For example, the system injects a placeholder security credential (e.g., a dummy or temporary security credential) into the IAM role or field associated with the cluster. In some embodiments, in response to a determination that the cluster is to be re-purposed, the system disconnects the cluster from the customer network infrastructure. For example, the system resets the network communication settings for the cluster.

The system improves the instantiation of virtual machines or clusters by enabling rapid deployment of virtual machines or clusters to customer systems or tenants. For example, the deployment of virtual machines or clusters from pools managed by the system according to various embodiments enables virtual machines or clusters to be fully initialized and ready to service queries or tasks within approximately twenty seconds, and preferably within 10-15 seconds, and even more preferably less than 10 seconds. The system provides greater security and rapid deployment of clusters such as clusters within a multi-tenanted environment. The system provides greater security by ensuring that network connections of warmed-up but not yet deployed clusters or virtual machines are not configured until the clusters or virtual machines are allocated to a workspace, a tenant, or a customer system.

FIG. 1 is a block diagram of a network system according to various embodiments of the present application. According to various embodiments, system 100 is implemented in connection with system 200 of FIG. 2. In some embodiments, system 100 implements at least part of process 300 of FIG. 3, process 400 of FIG. 4, process 500 of FIG. 5, process 600 of FIG. 6, and/or process 700 of FIG. 7.

In the example illustrated in FIG. 1, system 100 includes cluster inventory service 110, cloud service 130, data store 140, user system 150 and/or administrator system 160. In some embodiments, cluster inventory service 110 and cloud service 130 are integrated (e.g., combined into a layer or a single set of server(s)). In some embodiments, cluster inventory service 110, cloud service 130, and/or data store 140 are integrated (e.g., combined into a layer or a single set of server(s)). In some embodiments, cluster inventory service 110 comprises data layer 115, machine instantiation layer 120, and/or machine configuration layer 125. In some embodiments, machine instantiation layer 120 and machine configuration layer 125 are integrated such as in a same layer (e.g., a control layer). In some embodiments, data layer 115 comprises a cluster (e.g., a cluster that cluster inventory service 110 instantiates such as by machine instantiation layer 120). System 100 further includes one or more networks such as network 170 over which user system 150 and/or administrator system 160 communicates with cluster inventory service 110, cloud service 130, and/or data store 140. In various embodiments, network 170 includes one or more of a wired network, and/or a wireless network such as a cellular network, a wireless local area network (WLAN), or any other appropriate network. In some embodiments, data layer 115, machine instantiation layer 120, and/or machine configuration layer 116 are respectively implemented by one or more servers. System 100 may include various other systems or devices.

According to various embodiments, data store 140 is a distributed data storage system. For example, data store 140 is a blob storage. In some embodiments, data store 140 comprises data for a plurality of customers of cluster inventory service 110 (e.g., different organizations or tenants registered with cloud service 130 and/or cluster inventory service 110). As an example, the data for the plurality of customers is not physically divided or segregated. For example, data among the plurality of customers is virtually segregated (e.g., the data is segmented among customer storage buckets respectively associated with a particular customer). In some embodiments, data stored in data store 140 is encrypted such as by using a security credential (e.g., a token, secret, etc.) associated with a particular customer or a particular tenant (e.g., a customer may be associated with a plurality of tenants).

According to various embodiments, system 100 comprises cluster inventory service 110. In some embodiments, cluster inventory service 110 manages starting up (e.g., instantiation, provisioning, etc.) of virtual machines and/or clusters, and maintains the virtual machines and/or clusters warm. In some embodiments, cluster inventory service 110 starts up virtual machines and/or clusters, and keeps the virtual machines and/or clusters warm in pools of clusters. The virtual machines and/or clusters are started up, configured, and kept warm in a state that is agnostic with respect to the workspace, tenant, or customer system to which the virtual machine or cluster is to be allocated (e.g., from the pool). For example, the virtual machines and/or clusters are configured to be deployed to various tenants within a multi-tenanted environment (e.g., the virtual machine or cluster may be allocated to any one tenant within a multi-tenanted environment). In some embodiments, cluster inventory service 110 configures the virtual machines and/or clusters to comprise a placeholder security credential (e.g., a dummy or temporary security credential). The placeholder security credential corresponds to a security credential that is agnostic with respect to the customer or tenant (e.g., the placeholder security credential does not provide authentication to any particular customer system). For example, cluster inventory service 110 sets the IAM role or field associated with the cluster or virtual machine to comprise the placeholder security credential. In some embodiments, the virtual machines and/or clusters are started up, configured, and kept warm in a state that is secure. For example, the virtual machines and/or clusters comprised in the pools managed by cluster inventory service 110 are configured to be disconnected (e.g., the virtual machines and/or clusters are comprised in untrusted subnetworks or otherwise are not configured to be connected with one another).

In some embodiments, cluster inventory service 110 uses machine instantiation layer 120 to start up the virtual machines and/or the clusters. Machine instantiation layer 120 may comprise, correspond to, or otherwise invoke a system for automating computer application deployment, scaling, and management of virtual machines and/or the clusters. For example, Kubernetes™ is invoked to start up the virtual machines and/or the clusters. Cluster inventory service 110 can use machine instantiation layer 120 to determine whether to start up a new virtual machine or cluster. For example, machine instantiation layer 120 uses a predicted usage and/or a monitoring of a status of a workspace/tenant/customer system in connection with determining whether to start up a virtual machine or cluster.

In some embodiments, cluster inventory service 110 uses machine configuration layer 125 to configure the virtual machines and/or the clusters in a manner that the virtual machines and/or clusters are agnostic to with respect to the workspace, tenant, or customer system to which the virtual machine or cluster is to be allocated. For example, machine configuration layer 125 inserts the placeholder security credential in a location at which the virtual machine or cluster stores security credentials that are used in connection with authenticating the virtual machine or cluster. After allocation/deployment of a virtual machine or cluster, the security credential is set to be specific to the workspace, tenant, or customer system in which the virtual machine or cluster is deployed. In some embodiments, in response to a determination by system 100 (e.g., by cluster inventory service 110) to allocate a virtual machine or cluster, the machine configuration layer 125 is used to replace (e.g., change) the placeholder security credential with a security credential associated with the customer.

In some embodiments, machine instantiation layer 120 and machine configuration layer are integrated in a single layer. For example, a control layer of cluster inventory service 110 comprises machine instantiation layer 120 and machine configuration layer.

In some embodiments, cluster inventory service 110 uses data layer 115 to maintain pools of clusters or virtual machines. For example, data layer 115 comprises a cluster inventory that comprises one or more pools of clusters or virtual machines. The plurality of cluster pools may comprise a subset of pools comprising clusters of driver nodes (or driver virtual machine), and a cluster pool comprising one or more clusters comprising worker nodes (e.g., a worker pool comprises only worker nodes). According to various embodiments, each of the pools in the subset of cluster pools comprises clusters of a particular class of driver (e.g., a driver node). As an example, the system can comprises a set of classes of environments (e.g., operating environment to which a node is deployed), and each class of environment can have certain processing or memory requirements. The system comprises a class of driver corresponding to a class of environment (e.g., for each class of environment the system comprises a predefined class of driver).

According to various embodiments, system 100 uses cloud service 130 to provide services for one or more customers or tenants. For example, cloud service 130 comprises a customer system and/or tenants that provide a cloud service for a customer. In some embodiments, cloud service 130 is integrated with cluster inventory service 110. For example, cluster inventory service 110 manages pools of clusters that may be deployed to various workspaces/tenants/customer systems being used to provide cloud services via cloud service 130.

According to various embodiments, system 100 comprises user system 150. User system 150 is used by a user (e.g., a developer such as a developer of code, a developer of a model, a user of an organization associated with a one or more datasets stored at data store 140, etc.) to communicate with cluster inventory service 110 (e.g., data layer 115, machine instantiation layer 120, machine configuration layer 125, etc.) and/or data stored in data store 140. As an example, user system 150 communicates with cluster inventory service 110 via a web-interface. In some embodiments, a user uses user system 150 to develop code or develop/manage a service on a business application layer, which makes a call to cluster inventory service 110, cloud service 130, and/or or data store 140, to modify code at a business application (e.g., to execute code against data stored in data store 140), to query data store 140 (e.g., in connection with discovering code, a library, a module, etc.), to deploy a cloud service 130, etc.

According to various embodiments, system 100 comprises an administrator system 160 for use by an administrator such as an administrator of cluster inventory service 110 or an administrator of a customer associated with an instance or tenant being deployed by data layer 115 and/or data store 140. For example, administrator system 160 comprises a system for communication, data access, computation, etc. An administrator uses administrator system 160 to maintain data store 140 (e.g. maintain raw data comprised in data store 140), to define and manage applications provided by system 100, to manage a workspace, tenant, or customer system (e.g., a workspace, tenant, or customer system that is associated with, or that provides a service on cloud service 130, etc.). For example, an administrator uses administrator system 150 to define one or more security policies that are to be enforced with respect to data stored at data store 140. As another example, an administrator uses administrator system 160 to define security policies or credentials for clusters or virtual machines that are allocated to workspaces/tenants/customer systems (e.g., to set a security credential to be used with respect to a particular tenant). Administrator system 160 communicates with cluster inventory service 110 via a web-interface (e.g., by using a web browser, etc.). For example, administrator system 160 communicates with cluster inventory service 110 via a web-browser installed on administrator system 160. As another example, administrator system 160 communicates with cluster inventory service 110 via an application running on administrator system 160.

Figure 2:
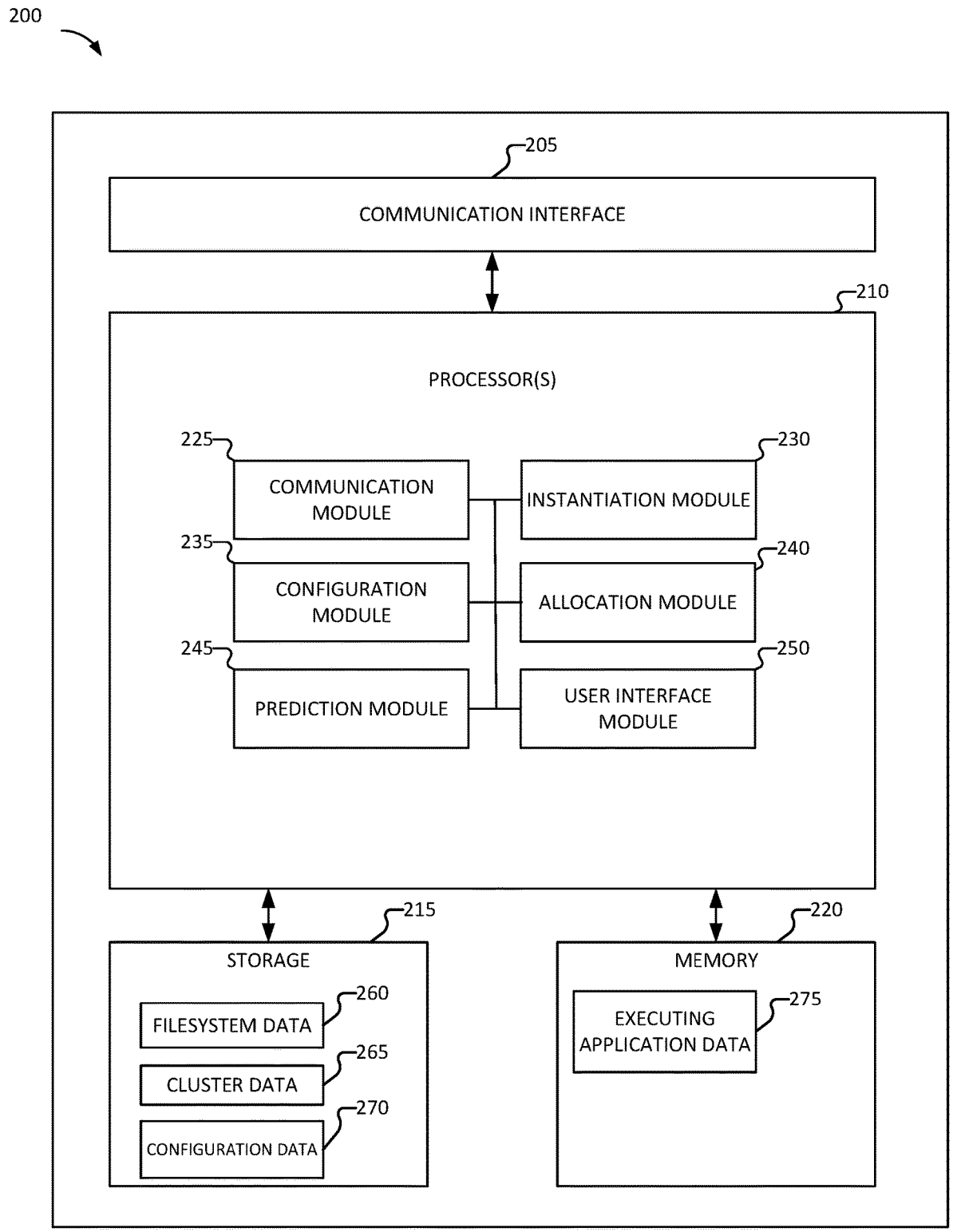
FIG. 2 is a block diagram of a cluster inventory service system according to various embodiments of the present application.

FIG. 2 is a block diagram of a cluster inventory service system according to various embodiments of the present application. According to various embodiments, system 200 is implemented at least in part by system 100 of FIG. 1. In some embodiments, system 200 implements at least part of process 300 of FIG. 3, process 400 of FIG. 4, process 500 of FIG. 5, process 600 of FIG. 6, and/or process 700 of FIG. 7.

In the example shown, system 200 implements one or more modules in connection with starting up clusters/virtual machines, maintaining clusters/virtual machines in a warmed up state (e.g., in a manner that is agnostic to a particular workspace/tenant/customer system), configuring clusters/virtual machines, allocating clusters/virtual machines to a workspace/tenant/customer system, monitoring performance of a workspace/tenant/customer system, predicting usage of a workspace/tenant/customer system, determining whether to start up a cluster/virtual machine based at least in part on the monitoring of performance or the predicted usage, etc. System 200 comprises communication interface 205, one or more processors 210, storage 215, and/or memory 220. One or more processors 210 comprises one or more of communication module 225, instantiation module 230, configuration module 235, allocation module 240, prediction module 245, and/or user interface module 250.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data request for data stored in a data store, a request to configure or deploy a service such as a web service, etc. The user input to the user system can include the creation of a new file, a modification or update to a file, a query for a file (e.g., a csv file, a library, a module, etc.), a request to set one or more security policies (e.g., a permission with respect to accessing a file or a directory), a modification or configuration of a service such as a web service, etc. For example, the user develops or requests execution of code in a workspace provided by a user system. Communication module 225 is configured to provide to various user systems information such as user interface (e.g., an interface corresponding to a workspace or notebook), information that is responsive to one or more queries or tasks requested to be executed, locations at which data is to be accessed, credentials for accessing data, performance characteristics of a workspace, tenant, or customer system associated with a customer, predicted usage (e.g., information pertaining to an estimation of future use of a virtual machine or cluster), etc.

In some embodiments, system 200 uses instantiation module 230 to start up (e.g., instantiate, provision, etc.) one or more virtual machines or clusters. In some embodiments, instantiation module 230 starts up virtual machines or clusters that are driver nodes or worker nodes. As an example, instantiation module 230 configures virtual machines or clusters according to a particular class of environment. For example, system 200 starts up virtual machines or clusters, and maintains pools of virtual machines or clusters for rapid deployment. System 200 maintains pools of virtual machines or clusters for a set of classes of environments (e.g., operating environment to which a node is deployed). Each class of environment can have certain processing or memory requirements. In some embodiments, instantiation module 230 uses a predefined configuration (e.g., a template, a mapping of fields to settings, etc.) associated with a particular class in connection with starting up the one or more virtual machines or clusters. In some embodiments, in response to determining to start up a virtual machine or cluster, instantiation module 230 invokes a service (e.g., Kubernetes™) to create the virtual machine or cluster.

In some embodiments, instantiation module 230 determines when to start up a virtual machine or cluster, and a number of virtual machines or clusters to start up and/or maintain as warmed up. For example, instantiation module 230 determines to start up a virtual machine or a cluster in response to a determination that a number of virtual machines or cluster (e.g., in total, or a class-by-class basis) in the pools (e.g., the cluster pool) is below a threshold value. As another example, instantiation module 230 determines to start up a virtual machine or a cluster in response to a determination a number of virtual machines or clusters (e.g., in total, or a class-by-class basis) in the pools is below a predicted value (e.g., predicted usage), or below an expected amount of virtual machines or clusters that are to be allocated within a threshold period of time (e.g., a time required to start up a virtual machine, etc.). In some embodiments, instantiation module 230 obtains the predicted value or other expectations pertaining to capacity, usage, etc.

In some embodiments, system 200 uses configuration module 235 to configure virtual machines or clusters. As an example, a virtual machine or cluster is configured according to a class of environment to which the virtual machine or cluster is to correspond. In some embodiments, configuration module 235 configures the virtual machine or cluster based at least in part on a predefined configuration (e.g., a template, a mapping of fields to settings, etc.) associated with a particular class in connection with starting up the of virtual machine or cluster.

According to various embodiments, configuration module 235 causes the virtual machine or cluster to be configured according to a state that is agnostic to with respect to the workspace, tenant, or customer system to which the virtual machine or cluster is to be allocated (e.g., from the pool). For example, configuration module 235 configures virtual machines and/or clusters to be deployed to various tenants within a multi-tenanted environment (e.g., the virtual machine or cluster may be allocated to any one tenant within a multi-tenant environment or to a workspace within a multi-workspace setup within a single customer). In some embodiments, configuration module 235 configures the virtual machines and/or clusters to comprise a placeholder security credential (e.g., a dummy or temporary security credential). The placeholder security credential corresponds to a security credential that is agnostic with respect to the customer or tenant (e.g., the placeholder security credential does not provide authentication to any particular customer system). For example, configuration module 235 sets the IAM role or field associated with the cluster or virtual machine to comprise the placeholder security credential. In some embodiments, the virtual machines and/or clusters are started up, configured, and kept warm in a state that is secure. For example, configuration module 235 configures the virtual machines and/or clusters to be disconnected (e.g., the virtual machines and/or clusters are comprised in untrusted subnetworks or otherwise are not configured to be connected with one another).

In some embodiments, system 200 uses allocation module 240 to allocate virtual machines or clusters to customer systems or tenants. Allocation module 240 determines whether/when to allocate the virtual machine or cluster, and configures the virtual machine or cluster in connection with allocating the virtual machine or cluster to the target workspace, tenant, or customer system (e.g., the system to which the cluster is to be deployed). In some embodiments, allocation module 240 determines to allocate a virtual machine or cluster in response to receiving an allocation associated with a customer (e.g., from the customer system, a tenant associated with the customer, system, etc.). In some embodiments, allocation module 240 determines to allocate a virtual machine or cluster in response to determining that a capacity of a workspace, tenant, or customer system is less than a capacity threshold. As an example, the capacity threshold may be predefined or based on a level of service associated with the workspace/tenant/customer system (e.g., the capacity threshold may be configured based on a level of service, such as time to process queries, that the customer has configured or has committed to). In some embodiments, allocation module 240 determines to allocate a virtual machine or cluster in connection with status of a workspace/tenant/customer system (e.g., a status that is determined by system 200 based on a monitoring of the workspace/tenant/customer system). For example, allocation module 240 determines to allocate a virtual machine or cluster based at least in part on monitored processing times (e.g., in response to a determination that a monitored processing time exceeds a threshold processing time, such as a processing time configured for the customer or for a level of service the customer has selected to provide).

In some embodiments, in response to determining to allocate a virtual machine or cluster, allocation module 240 updates a mapping of the virtual machine or cluster to reflect the allocation of the virtual machine or tenant to the corresponding workspace/tenant/customer system. Allocation module 240 also causes the configurations for the virtual machine/cluster to be updated to correspond to the workspace/tenant/customer system to which the virtual machine or cluster is allocated. As an example, in response to allocating the virtual machine or cluster or determining to allocate the virtual machine or cluster, allocation module 240 invokes configuration module 235 to correspondingly configure the virtual machine or cluster. Examples of the configurations being updated in connection with allocation include: an update to the security credential (e.g., insertion of the customer-specific or tenant-specific security credential to replace the placeholder security credential).

In some embodiments, system 200 uses prediction module 245 to perform various predictions with respect to usage of virtual machines or clusters. In some embodiments, prediction module 245 predicts a capacity of a workspace/tenant/customer system, a processing time of a workspace/tenant/customer system, a quality of service that the workspace/tenant/customer system provides, etc. Prediction module 245 can use historical information pertaining to the performance and/or capacity of computer systems/tenants in connection with determining a prediction or estimate of future performance, capacities, or requirements for a virtual machine or cluster. Prediction module 245 determines a predicted usage. As an example, the predicted usage corresponds to an expected demand for clusters such as a cluster corresponding to a particular environment (e.g., a driver cluster). In response to determining the predicted usage, system 200 (e.g., instantiation module 230) uses the predicted usage in connection with determining an amount of clusters (e.g., an amount of a particular type of cluster) to maintain. For example, system 200 uses the predicted usage to determine whether to start up a new cluster and/or whether to terminate a cluster. In some embodiments, the system uses a predicted usage in connection with determining a size of a pool comprising worker nodes, such as a determining a number of worker nodes comprised in the worker pool.

In some embodiments, prediction module 245 uses a machine learning process in connection with determining such prediction or estimate. Examples of machine learning processes that can be implemented in connection with training a machine learning model for determining a prediction or estimate include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

In some embodiments, system 200 comprises user interface module 250. System 200 uses user interface module 250 to provide information to a user system (e.g., a workspace, a notebook such as a user interface for code development, a workspace for a cloud service such as a workspace for code development, an interface for a web application, etc.). In some embodiments, user interface module 250 provides an indication of a status of one or more cluster pools, a status of a workspace, tenant, or customer system (e.g., information obtained by system 200 monitoring performance of workspaces/tenants/customer systems, etc.), an indication of allocation of virtual machines or clusters to workspaces/tenants/customer systems, an indication of a security policy for a workspace/tenant/customer system, etc. User interface module 250 can provide a workspace in a web user interface that is rendered at a user system (e.g., rendered in a web browser via which user system is accessing the system). User interface module 250 can further provide a user interface to administrator system 150 to enable an administrator to manage and/or configuring settings of system 200 or cluster inventory service 110. In some embodiments, user interface module 250 provides a user interface for various other applications such as applications provided by a business application layer.

Figure 3:
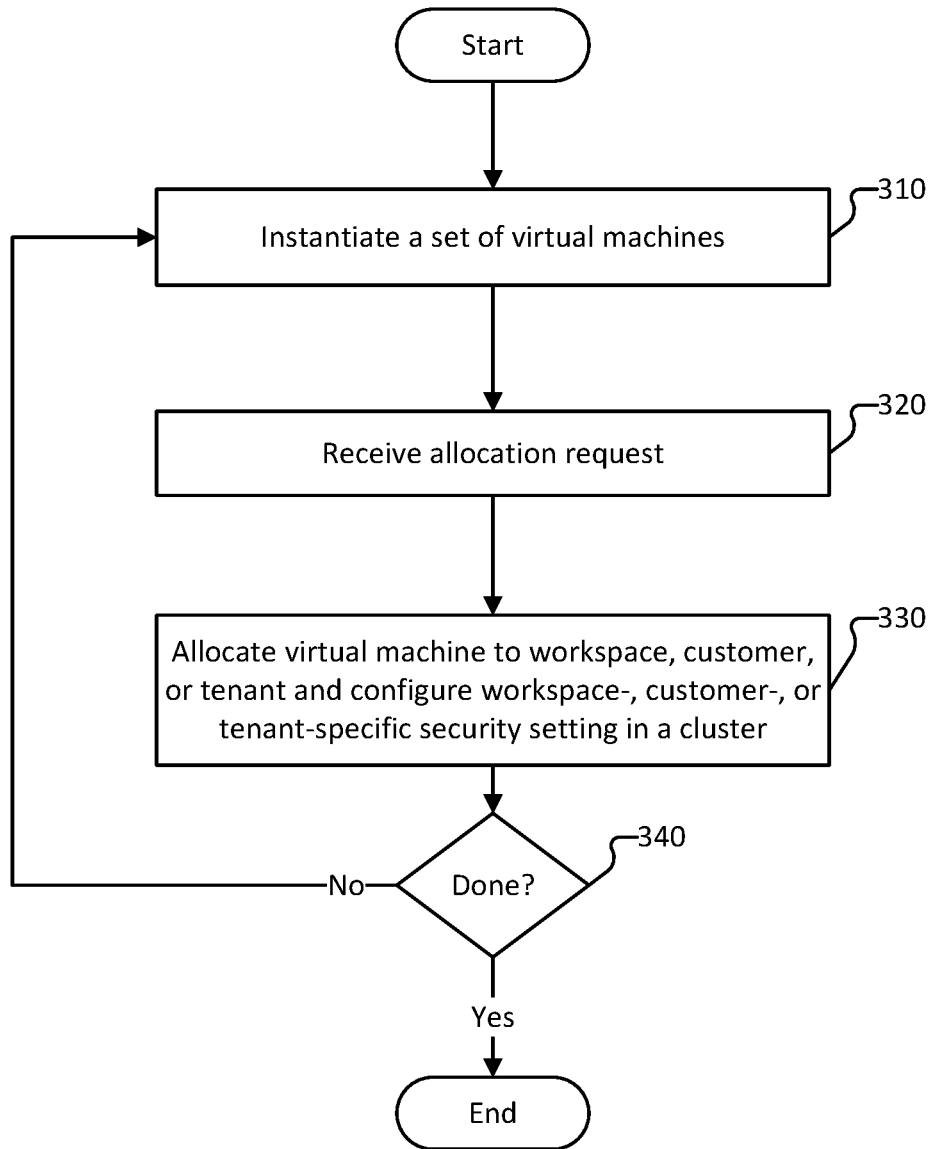
FIG. 3 is a flow diagram of a method for allocating a warmed-up cluster to a customer according to various embodiments of the present application.

FIG. 3 is a flow diagram of a method for allocating a warmed-up cluster to a customer according to various embodiments of the present application. According to various embodiments, process 300 is implemented at least in part by system 100 of FIG. 1 and/or system 200 of FIG. 2. In some embodiments, process 300 is implemented in connection with process 400 of FIG. 4, process 500 of FIG. 5, process 600 of FIG. 6, and/or process 700 of FIG. 7.

At 310, a set of virtual machines are instantiated. According to various embodiments, the set of virtual machines or clusters are started up (e.g., instantiated, provisioned, etc.) before receiving a corresponding allocation request with respect to collocating such virtual machines or cluster (e.g., to a workspace, tenant, or customer system, etc.). In some embodiments, the system starts up the set of virtual machines or clusters and maintains the set of virtual machines or clusters (e.g., in a warmed up state in cluster pools, etc.) in a manner that the set of virtual machines or clusters are allocable in a multi-tenant environment. For example, a virtual machine or cluster can be allocated from a pool to any one of a workspace, tenant, or customer system within an environment. As an example, a cluster in one of the plurality of cluster pools is maintained in a manner that the configurations are agnostic with respect to the customer or tenant to whom the cluster is allocated and/or deployed.

According to various embodiments, the provisioning of a cluster comprised in a cluster pool comprises using a placeholder security credential. As an example, the placeholder security credential corresponds to a dummy or temporary security credential. The security credential (e.g., the placeholder security credential, or a customer-specific or tenant-specific security credential when the placeholder security credential is replaced) may be a token. For example, the security credential may be an alphanumeric string. In some embodiments, the placeholder security credential is inserted into the IAM role or field associated with the cluster. The placeholder security credential corresponds to a security credential that is agnostic with respect to the customer or tenant (e.g., the placeholder security credential does not provide authentication to any particular customer system).

According to various embodiments, the system determines to start up a virtual machine or a cluster in response to a determination that a number of virtual machines or cluster (e.g., in total, or a class-by-class basis, or other basis, etc.) in the pools (e.g., the cluster pool) is below a threshold value. As another example, the system determines to start up a virtual machine or a cluster in response to a determination a number of virtual machines or clusters (e.g., in total, or a class-by-class basis, or other basis, etc.) in the pools is below a predicted value (e.g., predicted usage), or below an expected amount of virtual machines or clusters that are to be allocated within a threshold period of time (e.g., a time required to start up a virtual machine, etc.). In some embodiments, the system obtains the predicted value or other expectations pertaining to capacity, usage, etc.

At 320, an allocation request is received. In some embodiments, the allocation request corresponds to a virtual machine allocation request, a cluster allocation request, etc. As an example, the allocation request is received from a workspace, tenant, or customer system. As another example, the allocation request is obtained based on a determination that a virtual machine or cluster is to be allocated to the workspace, tenant, or customer system (e.g., based on a monitoring of the workspace/tenant/customer system, a predicted usage, etc.).

In some embodiments, the system determines to allocate a virtual machine or cluster in response to receiving an allocation associated with a customer (e.g., from the customer system, a tenant associated with the customer, system, etc.). In some embodiments, the system determines to allocate a virtual machine or cluster in response to determining that a capacity of a workspace, tenant, or customer system is less than a capacity threshold. As an example, the capacity threshold may be predefined or based on a level of service associated with the workspace/tenant/customer system (e.g., the capacity threshold may be configured based on a level of service, such as time to process queries, that the customer has configured or has committed to). In some embodiments, the system determines to allocate a virtual machine or cluster in connection with status of a workspace/tenant/customer system (e.g., a status that is determined by the system based on a monitoring of the workspace/tenant/customer system). For example, the system determines to allocate a virtual machine or cluster based at least in part on monitored processing times (e.g., in response to a determination that a monitored processing time exceeds a threshold processing time, such as a processing time configured for the customer or for a level of service the customer has selected to provide).

At 330, a virtual machine is allocated to the workspace, customer, or tenant and a workspace-, customer-, or tenant-specific security setting is configured in a cluster. In some embodiments, in response to a determination to allocate the virtual machine or cluster to a workspace/tenant/customer system, the system allocates the virtual machine or cluster, and configures the virtual-machine or cluster for the workspace/tenant/customer system (e.g., to operates within the workspace/tenant/customer system). For example, in response to determining to allocate the virtual machine/tenant, the system configures the virtual machine/cluster from a configuration that is agnostic with respect to the specific workspace/tenant/customer system to which the virtual machine/cluster is allocated to a configuration that is specific to the workspace/tenant/customer system to which the virtual machine/cluster is allocated. According to various embodiments, the system configures one or more dynamic security settings for the virtual machine/cluster in connection with allocating the virtual machine/cluster.

In some embodiments, in response to a determination that the cluster is to be allocated, the cluster is configured (e.g., updated) to comprise a credential (e.g., a token, a secret, etc.) to access storage associated with the workspace, tenant, or customer system to which the cluster is allocated. In response to, or in connection with, the committing the allocation of the cluster, the system sends an update to the cluster. In some embodiments, the update to the cluster comprises a configuration that is used for the customer system (e.g., a customer-specific or tenant-specific configuration). The update to the cluster may be sent via an update to a CRD. According to various embodiments, the update to the cluster includes replacing the placeholder security credential with a security credential associated with the customer (e.g., a customer-specific or tenant-specific security credential). In response to allocation of the cluster, the system modifies the cluster at an infrastructure-level. For example, the system configures the cluster to connect a worker node comprised in the cluster to a driver node comprised in the cluster. As another example, the system connects the cluster (e.g., the nodes comprised within the cluster) to the customer infrastructure. For example, the system (e.g., the control plane of the system) may configure a network connection of the cluster to be able to communicate with the customer system. The system determines the allocated cluster to be ready to provide service on the customer system (e.g., to service queries, tasks, etc.) in response to a determination by the system (e.g., by the control plane of the system) that the driver node of the cluster is ready (e.g., initialized) and at least one worker node is ready (e.g., initialized for the customer system).

At 340, a determination is made as to whether process 300 is complete. In some embodiments, process 300 is determined to be complete in response to a determination that no further virtual machines are to be instantiated, the system does not currently require instantiation of another virtual machine (e.g., that the current cluster pools are sufficient to handle the capacity that may be required by workspaces/tenants/customer systemsworkspaces/tenants/customer systems), an administrator indicates that process 300 is to be paused or stopped, a determination that a fault occurred at the data store or in execution of code via the workspace, etc. In response to a determination that process 300 is complete, process 300 ends. In response to a determination that process 300 is not complete, process 300 returns to 310.

Figure 4:
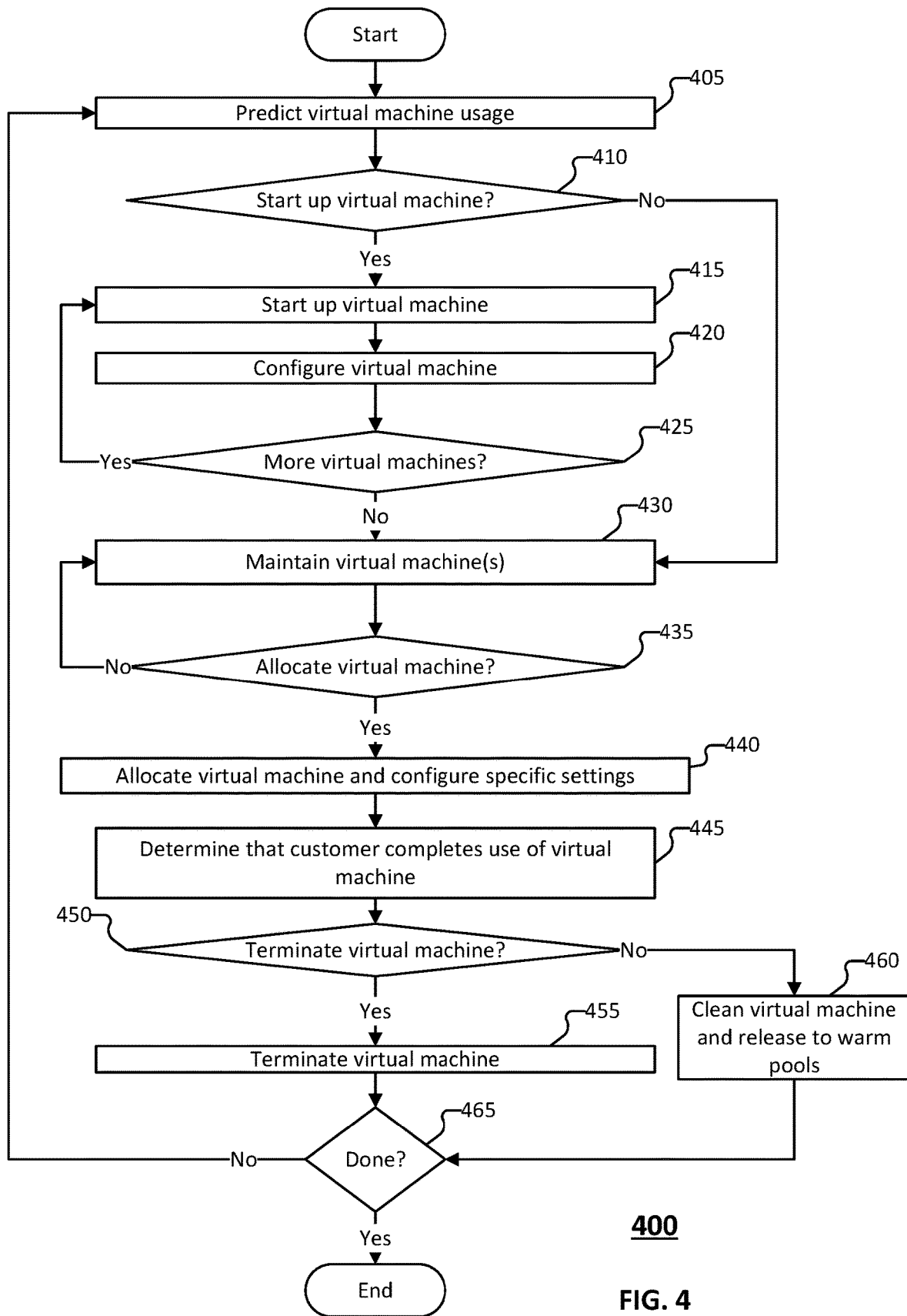
FIG. 4 is a flow diagram of a method for warming-up virtual machines and managing allocation of the virtual machine to a customer according to various embodiments of the present application.

FIG. 4 is a flow diagram of a method for warming-up virtual machines and managing allocation of the virtual machine to a customer according to various embodiments of the present application. According to various embodiments, process 400 is implemented at least in part by system 100 of FIG. 1 and/or system 200 of FIG. 2. In some embodiments, process 400 is implemented in connection with process 300 of FIG. 3, process 500 of FIG. 5, process 600 of FIG. 6, and/or process 700 of FIG. 7. Although process 400 is described in connection with a virtual machine, process 400 can be implemented in connection with a cluster.

At 405, virtual machine usage is predicted. In some embodiments, the system predicts usage of virtual machines (or clusters) for a particular workspace/tenant/customer system, or across various workspaces/tenants/customer systemsworkspaces/tenants/customer systems.

At 410, a determination of whether to start up a virtual machine is made. In some embodiments, the system uses a predicted usage and/or a monitoring of a status of a workspace/tenant/customer system in connection with determining whether to start up a virtual machine or cluster. For example, the system determines to start up a virtual machine in response to a determination that a predicted usage exceeds a current inventory of virtual machines/clusters in warm pools (e.g., that predicted usage exceeds the current inventory by a threshold value, etc.).

In response to a determination to start up a virtual machine at 410, process 400 proceeds to 415 at which a virtual machine is started up. In some embodiments, the system starts up the virtual machine by invoking a service for automating computer application deployment, scaling, and management of virtual machines and/or the clusters (e.g., Kubernetes™). As an example, the system starts up the virtual machine according to a class of environment for which the virtual machine is to correspond (e.g., in response to a determination that an inventory of virtual machines of a certain class is less than the predicted usage for such class, a new virtual machine of such class is started up).

At 420, the virtual machine is configured. In some embodiments, the virtual machine is preloaded with components that are used or needed at runtime. For example, the virtual machine may be preloaded with all components needed at runtime. In some embodiments, the virtual machines comprised in a pool being maintained by the system are configured (e.g., provisioned or preloaded with components) in a manner that the virtual machines are extensible to various customers. For example, the virtual machines are maintained in the pool in a manner that the configuration of the cluster is agnostic to the specific customer to which the cluster is eventually allocated (e.g., after allocation the virtual machines are configured using various customer-specific configurations). As another example, the virtual machines are maintained in the cluster pool in a manner that the configuration of the virtual machines are agnostic to the specific customer to which the virtual machines are eventually allocated at least with respect to a same class of virtual machines/environment in which the virtual machines are allocable.

According to various embodiments, the virtual machine is configured using a placeholder security credential. As an example, the placeholder security credential corresponds to a dummy or temporary security credential. The security credential (e.g., the placeholder security credential, or a customer-specific or tenant-specific security credential when the placeholder security credential is replaced) may be a token. For example, the security credential may be an alphanumeric string. In some embodiments, the placeholder security credential is inserted into the IAM role or field associated with the virtual machine (or cluster). The placeholder security credential corresponds to a security credential that is agnostic with respect to the customer or tenant (e.g., the placeholder security credential does not provide authentication to any particular customer system).

In some embodiments, the configuring the virtual cluster comprises ensuring that the virtual cluster does not comprise network connection bindings to other virtual machines or nodes. The virtual machine can be configured to belong to an untrusted subnetwork.

At 425, a determination of whether to start up an additional virtual machine(s) is made. In some embodiments, the system determines whether to start up an additional virtual machine based at least in part on monitoring one or more workspaces/tenants/customer systems, determining a performance of one or more workspaces/tenants/customer systems, determining an inventory of pools comprising warm virtual machines/clusters, determining a predicted usage, etc.

In response to a determination that an additional virtual machine(s) is to be started up at 425, process 400 returns to 415. Conversely, in response to a determination not to start up an additional virtual machine(s) at 425, process 400 proceeds to 430. Similarly, in response to a determination not to start up a virtual machine at 410, process 400 proceeds to 430.

At 430, the virtual machine(s) is maintained. In some embodiments, the virtual machine is maintained in a pool of warm clusters or virtual machines. For example, the pool of warm clusters or virtual machines comprise virtual machines that are started up but not specifically configured for any one particular customer or any one particular tenant in a multi-tenanted environment. The pool of clusters or virtual machines corresponds to an inventory of clusters or virtual machines that are allocable to a workspace/tenant/customer system in response to an allocation request.

At 435, a determination of whether to allocate the virtual machine is made. In response to a determination not to allocate the virtual machine at 435, process 400 returns to 430. Conversely, in response to a determination to allocate the virtual machine at 435, the process proceeds to 440.

At 440, virtual machine is allocated and specific settings are configured. For example, a virtual machine from the pool is retrieved and allocated for use and workspace-, customer-, or tenant-specific settings are configured for the virtual machine so that the machine is ready for use by the customer.

At 445, the customer is determined to complete use of the virtual machine. In some embodiments, the system determines that the customer is finished using the virtual machine based at least in part on an indication from the workspace, tenant, or customer system (e.g., an indication that the virtual machine may be terminated or reallocated). In some embodiments, the system determines that the customer is finished using the virtual machine based at least in part on a monitoring of the workspace/tenant/customer system. For example, the system monitors the performance or state of the workspace/tenant/customer system. In response to the system determining that the workspace/tenant/customer system has excess capacity (e.g., that performance with respect to servicing queries is less than a threshold value, etc.), the system determines that the customer no longer needs the virtual machine and may deem the use of the virtual machine as complete.

At 450, a determination is made whether to terminate the virtual machine. In some embodiments, in response to determining that the customer's use of the virtual machine is complete, the system determines whether to terminate the virtual machine. As an example, a determination of whether to terminate a virtual machine can be based at least in part on a finished using the virtual machine based at least in part on a security policy associated with the system (e.g., a service provider to a plurality of customers such as a service provider that hosts a multi-tenanted environment, which can service a plurality of customers, etc.). As an example, a determination of whether to terminate a virtual machine can be based at least in part on a finished using the virtual machine based at least in part on a security policy associated with the customer to which the virtual machine is allocated (e.g., the customer security policy may indicate that the customer does not permit a virtual machine allocated to it to be reallocated/repurposed).

In response to a determination to terminate the virtual machine at 450, process 400 proceeds to 455 at which the virtual machine is terminated.

Conversely, in response to a determination not to terminate the virtual machine at 450, process 400 proceeds to 450 at which the virtual machine is cleaned and released to the warm pools.

In some embodiments, in response to a determination to repurpose the cluster, the system cleans or deletes information comprised in the cluster such as to ensure that the cluster is secure and clean. For example, repurposing the cluster comprises cleaning the cluster and re-inserting the cluster into the cluster pool corresponding to an inventory of cluster pools (e.g., the cleaned cluster is re-allocated to the corresponding cluster pool. The determination that the customer system is finished using the cluster may be based on an instruction provided by the customer system, or based on indication pertaining to a performance of the customer system (e.g., an indication of the customer system capacity, an indication of the customer system demands or requirements, or both, etc.). In response to determining to repurpose the cluster, the system removes data from the cluster (e.g., a worker node) and resets security settings of the cluster to disconnect the cluster from the customer system. As an example, the system configures dynamic security settings or configurations of the cluster to correspond to a cluster that is agnostic to a workspace, a tenant, or a customer (e.g., a workspace, a tenant, or a customer for which the cluster will be redeployed/reallocated). For example, the system removes a customer-specific (or tenant-specific) security credential (e.g., token) from the cluster being repurposed. The system may insert a placeholder security credential in place of a customer-specific security credential. For example, the system injects a placeholder security credential (e.g., a dummy or temporary security credential) into the IAM role or field associated with the cluster. In some embodiments, in response to a determination that the cluster is to be re-purposed, the system disconnects the cluster from the customer network infrastructure. For example, the system resets the network communication settings for the cluster.

At 465, a determination is made as to whether process 400 is complete. In some embodiments, process 400 is determined to be complete in response to a determination that no further virtual machines are to be started up, the system does not currently require start up of another virtual machine (e.g., that the current cluster pools are sufficient to handle the capacity that may be required by workspaces/tenants/customer systems), an administrator indicates that process 400 is to be paused or stopped, a determination that a fault occurred at the data store or in execution of code via the workspace, etc. In response to a determination that process 400 is complete, process 400 ends. In response to a determination that process 400 is not complete, process 400 returns to 405.

Figure 5:
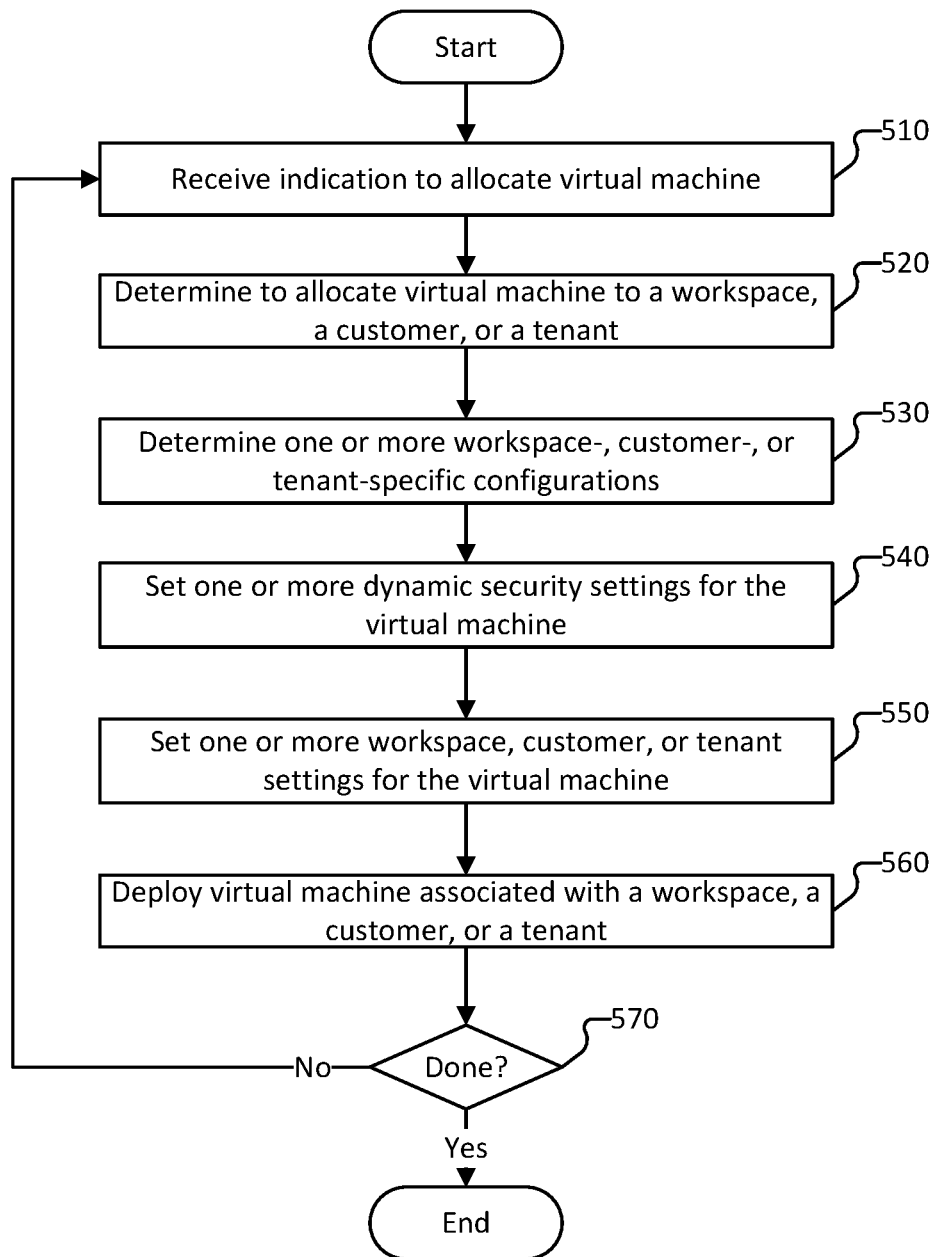
FIG. 5 is a flow diagram of a method for allocating a virtual machine from a pool of warmed-up clusters according to various embodiments of the present application.

FIG. 5 is a flow diagram of a method for allocating a virtual machine from a pool of warmed-up clusters according to various embodiments of the present application. According to various embodiments, process 500 is implemented at least in part by system 100 of FIG. 1 and/or system 200 of FIG. 2. In some embodiments, process 500 is implemented in connection with process 300 of FIG. 3, process 400 of FIG. 4, process 600 of FIG. 6, and/or process 700 of FIG. 7.

At 510, an indication to allocate the virtual machine is received. In some embodiments, the allocation request corresponds to a virtual machine allocation request, a cluster allocation request, etc. As an example, the allocation request is received from a workspace, tenant, or customer system. As another example, the allocation request is obtained based on a determination that a virtual machine or cluster is to be allocated to the workspace, tenant, or customer system (e.g., based on a monitoring of the workspace/tenant/customer system, a predicted usage, etc.).

At 520, the virtual machine is determined to be allocated to a workspace, a customer, or a tenant. In some embodiments, the system determines the type of virtual machine (or cluster) to allocate to the customer. For example, determination of the virtual machine to allocate to the workspace, the customer, or the tenant, is based on an allocation request received from the workspace, the customer, or the tenant. The allocation request can include an indication of a class of virtual machine (e.g., a class of driver) to be allocated, or a class of environment in which the virtual machine is to be allocated. As another example, the determination of the virtual machine to allocate to the workspace, customer, or tenant is based at least in part on a class of environment used (e.g., the workspace, tenant, or customer system, etc.).

At 530, one or more workspace-, customer-, or tenant-specific configurations are determined. The system determines the one or more workspace-, customer-, or tenant-specific configurations based at least in part on the workspace, customer, customer system, and/or tenant to which the virtual machine is to be allocated. For example, the one or more workspace-, customer-, or tenant-specific configurations include one or more security configurations (e.g., according to a security parameter, etc.). As another example, the one or more workspace-, customer-, or tenant-specific configurations include configurations for the customer infrastructure such as network connections, etc.

At 540, one or more dynamic security settings are set for the virtual machine. In some embodiments, in response to determining the one or more customer-specific configurations, the system sets one or more dynamic security settings corresponding to the workspace, customer, customer system, and/or or tenant. In some embodiments, the setting a dynamic security setting includes updating a security setting of the virtual machine that was set when the virtual machine was in the pool of warmed up virtual machines or clusters (e.g., replacing a placeholder security credential with a customer-specific security credential, tenant-specific security credential, etc.).

In some embodiments, the update to the cluster comprises a configuration that is used for the customer system (e.g., a customer-specific or tenant-specific configuration). The update to the cluster may be sent via an update to a CRD. According to various embodiments, the update to the cluster includes replacing the placeholder security credential with a security credential associated with the customer (e.g., a customer-specific or tenant-specific security credential). In response to allocation of the cluster, the system modifies the cluster at an infrastructure-level. For example, the system configures the cluster to connect a worker node comprised in the cluster to a driver node comprised in the cluster. As another example, the system connects the cluster (e.g., the nodes comprised within the cluster) to the customer infrastructure. For example, the system (e.g., the control plane of the system) may configure a network connection of the cluster to be able to communicate with the customer system. The system determines the allocated cluster to be ready to provide service on the customer system (e.g., to service queries, tasks, etc.) in response to a determination by the system (e.g., by the control plane of the system) that the driver node of the cluster is ready (e.g., initialized) and at least one worker node is ready (e.g., initialized for the customer system).

At 550, one or more workspace, customer, or tenant settings are set for the virtual machine. In some embodiments, in response to determining the one or more workspace-, customer-, or tenant-specific configurations, the system sets the one or more settings. For example, the system (e.g., the control plane of the system) may configure a network connection of the virtual machine to be able to communicate with the workspace, customer, or tenant system. As another example, the system binds the virtual machine to the various other clusters or data sources used in the workspace, customer, or tenant system.

At 560, the virtual machine is deployed to the workspace, customer, or tenant. The system determines the allocated virtual machine to be ready to provide service on the workspace, customer, or tenant system (e.g., to service queries, tasks, etc.) in response to a determination by the system that the virtual machine is configured according to the one or more workspace-, customer-, or tenant-specific configurations, and that the virtual machine is initialized.

At 570, a determination is made as to whether process 500 is complete. In some embodiments, process 500 is determined to be complete in response to a determination that no further virtual machines are to be allocation, the system does not currently require allocation of another virtual machine, an administrator indicates that process 500 is to be paused or stopped, a determination that a fault occurred at the data store or in execution of code via the workspace, etc. In response to a determination that process 500 is complete, process 500 ends. In response to a determination that process 500 is not complete, process 500 returns to 510.

Figure 6:
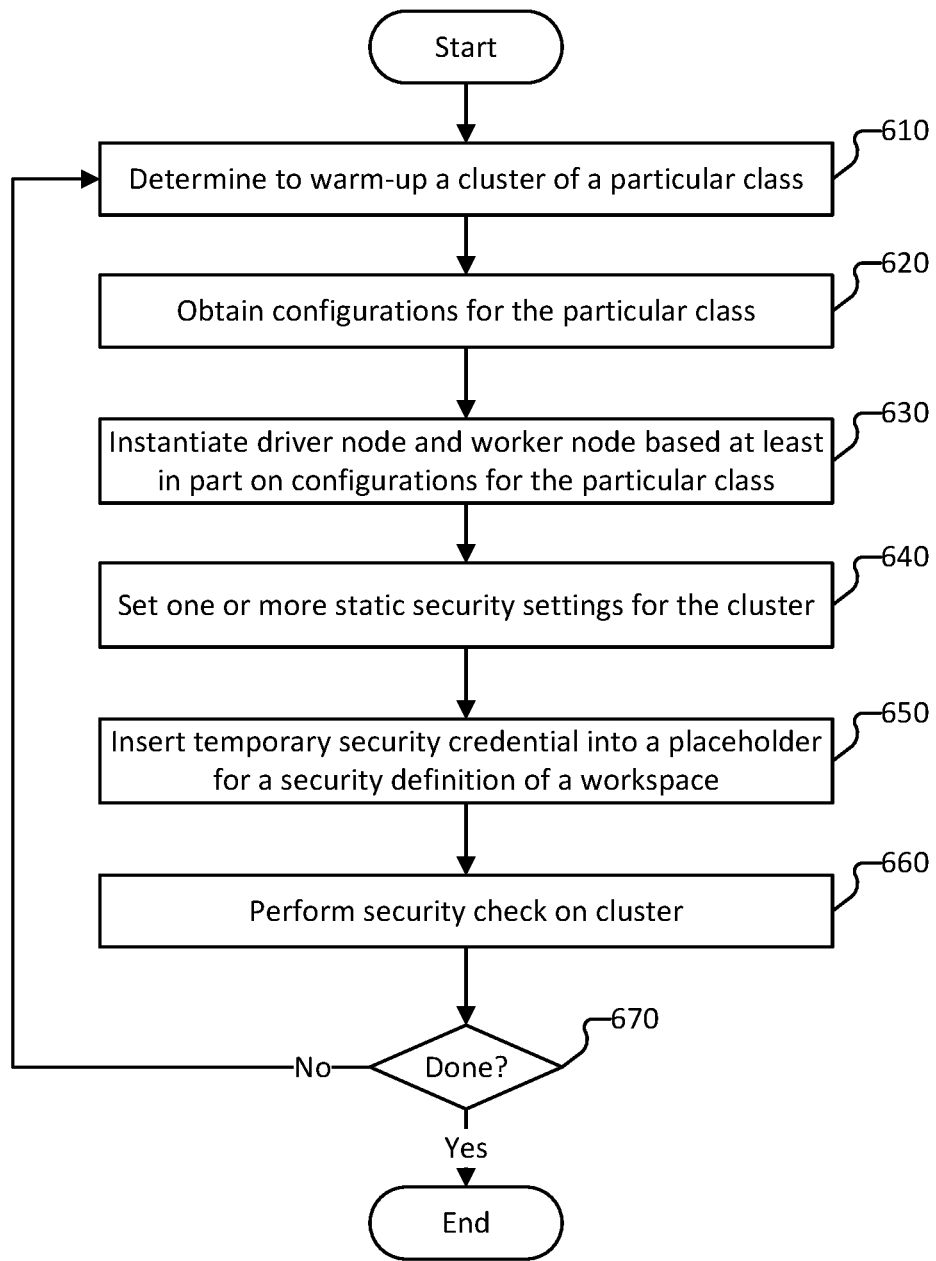
FIG. 6 is a flow diagram of a method for creating a pool of warmed-up clusters according to various embodiments of the present application.

FIG. 6 is a flow diagram of a method for creating a pool of warmed-up clusters according to various embodiments of the present application. According to various embodiments, process 600 is implemented at least in part by system 100 of FIG. 1 and/or system 200 of FIG. 2. In some embodiments, process 600 is implemented in connection with process 300 of FIG. 3, process 400 of FIG. 4, process 500 of FIG. 5, and/or process 700 of FIG. 7.

At 610, a cluster of a particular class is determined to be warmed up. In some embodiments, the cluster is determined to be warmed up based on a predicated usage. For example, if the system determines that the predicted usage exceeds the inventory available in current cluster pools (e.g., if the predicted usage exceeds the inventory by a threshold amount, etc.), the system determines to warm up a particular class. As another example, the system determines to warm up a cluster in response to a determination that an inventory of clusters (e.g., clusters of the particular class) falls below a predefined inventory threshold, etc.

At 620, configurations for the particular class are obtained. In some embodiments, the system obtains predefined configuration associated with a particular class in connection with starting up the one or more virtual machines or clusters. The predefined configuration can be a template, a mapping of fields to settings, etc.

At 630, a driver node and a worker node are started up based at least in part on the configurations for the particular class.

At 640, one or more static security settings are set for the cluster. For example, the system sets one or more security settings that are not updated/re-configured upon allocation of the cluster to a workspace/tenant/customer system. Examples of static security settings include ensuring that the IAM role has limited permissions, ensure that the container is not able to communicate outside (e.g., to other clusters, to other tenants, etc.), to ensure that untrusted subnetworks cannot communicate with trusted subnetworks (e.g., based at least in part on credentialing required to communicate with a trusted subnetwork, etc.), etc. As an example, a static setting (e.g., a static security-setting) is not updated contemporaneous with allocation of the cluster from a cluster pool to a customer system.

In some embodiments, the system associates an identifier for the cluster with a virtual machine in the cluster (e.g., each virtual machine in the cluster), and the system configures the cluster (e.g., the virtual machines within the cluster) to only communicate with other virtual machines within the cluster. For example, the system configures a virtual machine within the cluster to not be able to communicate with other cluster but to otherwise be able to service queries and provide service to the customer system.

At 650, a temporary security credential is inserted into a placeholder for a security definition of a workspace. In some embodiments, the system configures the cluster with one or more placeholder values or credentials, which will be updated upon allocation of the cluster. For example, the system inserts a placeholder security credential into the IAM role or field associated with the cluster. The placeholder security credential corresponds to a security credential that is agnostic with respect to the customer or tenant (e.g., the placeholder security credential does not provide authentication to any particular customer system).

At 660, a security check is performed with respect to the cluster. In some embodiments, in connection with starting up a cluster, the system performs a security check with respect to the cluster and/or a virtual machine (e.g., a node) within the cluster. As an example, the security check comprises determining (e.g., confirming) whether a connection setting for the cluster (or virtual machine) is set to be disconnected from infrastructures of other tenants (e.g., tenants associated with a customer), is set to cause virtual machines within the cluster to be unable to communicate outside the virtual machine or container, and/or the cluster is set to be unable to communicate with other clusters. As an example, the security check comprises determining whether a security credential comprised in the cluster is a placeholder security credential (e.g., token) such as a temporary or dummy security credential. As an example, the placeholder security credential corresponds to a security credential that is agnostic with respect to the customer or tenant to which the cluster is allocated and/or deployed. For example, the placeholder security credential does not provide access to a workspace, tenant, or customer system associated with a customer system. According to various embodiments, the placeholder security credential is comprised in the IAM role or field associated with the cluster. In some embodiments, the performing the security check comprises determining whether any cluster (or any machine within the cluster) has global permissions that enable the cluster to access information outside a tenant to which the cluster is (or is to be) deployed, or otherwise outside an environment or boundaries within which the cluster is to be accessing information.

At 670, a determination is made as to whether process 600 is complete. In some embodiments, process 600 is determined to be complete in response to a determination that no further clusters are to be warmed up, the system does not currently require instantiation of another virtual machine (e.g., that the current cluster pools are sufficient to handle the capacity that may be required by workspaces/tenants/customer systems), an administrator indicates that process 600 is to be paused or stopped, a determination that a fault occurred at the data store or in execution of code via the workspace, etc. In response to a determination that process 600 is complete, process 600 ends. In response to a determination that process 600 is not complete, process 600 returns to 610.

Figure 7:
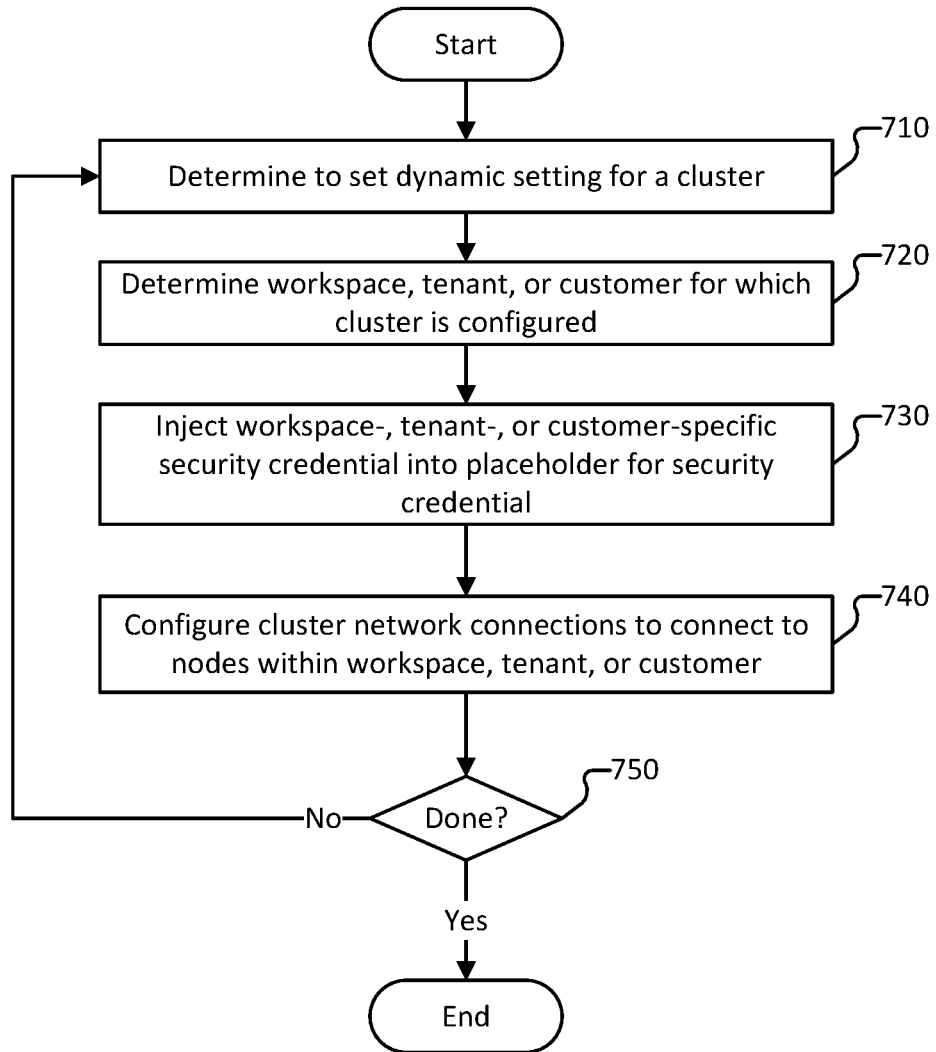
FIG. 7 is a flow diagram of a method for configuring for a customer a cluster that is allocated from a pool of warmed-up resources according to various embodiments of the present application.

FIG. 7 is a flow diagram of a method for configuring for a customer a cluster that is allocated from a pool of warmed-up resources according to various embodiments of the present application. According to various embodiments, process 700 is implemented at least in part by system 100 of FIG. 1 and/or system 200 of FIG. 2. In some embodiments, process 700 is implemented in connection with process 300 of FIG. 3, process 400 of FIG. 4, process 500 of FIG. 5, and/or process 600 of FIG. 6.

At 710, a dynamic setting is determined to be set for a cluster. In some embodiments, the system determines to set the dynamic setting for the cluster in response to a determination that the cluster is to be allocated. For example, the cluster is comprised in a pool of clusters that are maintained in a warm state but that are agnostic to a particular customer, system, or tenant to which the clusters are to be allocated, and in response to determining that a cluster is to be allocated, the system determines to set/update a dynamic setting for the cluster.

At 720, a workspace, a tenant, or a customer is determined for which the cluster is configured. In some embodiments, the system determines the workspace, tenant, or customer for which the cluster is configured based on a determination that the cluster is to be allocated to a workspace, tenant, or customer system. In some embodiments, determining the workspace, tenant, or customer for which the cluster is configured comprises determining a workspace, tenant, or customer system to which the cluster is to be allocated.

At 730, a workspace-, a tenant-, or customer-specific security credential is injected into a placeholder for the security credential. In some embodiments, in response to determining to allocate the cluster to a workspace, tenant, or customer, the system update the configurations of the cluster (e.g., the configurations used to cause the cluster, while in the cluster pool, to be agnostic with respect to workspace/tenant/customer system to which the cluster is deployed) configures the cluster to operate within the workspace/tenant/customer system.

The system may insert a workspace-, tenant-, or customer-specific security credential in place of a placeholder security credential. For example, the system injects a workspace-, tenant-, or customer-specific security credential (e.g., a credential associated with the customer system, a credential associated with a tenant of the customer, a credential associated with the workspace of a user, etc.) into the IAM role or field associated with the cluster.

At 740, a cluster network connection is configured to connect to other nodes within a workspace, a tenant, or a customer. In response to allocation of the cluster, the system modifies the cluster at an infrastructure-level. For example, the system configures the cluster to connect a worker node comprised in the cluster to a driver node comprised in the cluster. As another example, the system connects the cluster (e.g., the nodes comprised within the cluster) to the customer infrastructure. For example, the system (e.g., the control plane of the system) configures a network connection of the cluster to be able to communicate with the workspace, tenant, or customer system. The system determines the allocated cluster to be ready to provide service on the system (e.g., to service queries, tasks, etc.) in response to a determination by the system (e.g., by the control plane of the system) that the driver node of the cluster is ready (e.g., initialized) and at least one worker node is ready (e.g., initialized for the customer system).

At 750, a determination is made as to whether process 700 is complete. In some embodiments, process 700 is determined to be complete in response to a determination that no further virtual machines are to be instantiated, the system does not currently require instantiation of another virtual machine (e.g., that the current cluster pools are sufficient to handle the capacity that may be required by workspaces/tenants/customer systems), an administrator indicates that process 700 is to be paused or stopped, a determination that a fault occurred at the data store or in execution of code via the workspace, etc. In response to a determination that process 700 is complete, process 700 ends. In response to a determination that process 700 is not complete, process 700 returns to 710.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
instantiate a plurality of clusters, wherein a cluster is a set of nodes that work together, wherein a node is one of a virtual machine or a computer, wherein instantiating the plurality of clusters includes setting a temporary security credential for each virtual machine of one or more clusters of the plurality of clusters;
receive a request to allocate a cluster associated with a workspace, a customer, or a tenant; and
in response to the request to allocate a cluster:
allocate a cluster from the plurality of clusters, wherein allocating the cluster comprises replacing the temporary security credential of the cluster with a security credential associated with the workspace, the customer, or the tenant; and
a memory coupled to the one or more processors and configured to provide the one or more processors with instructions.

2. The system of claim 1, wherein the temporary security credential is a dummy credential that is set at warm-up of the one or more clusters based on a requirement that the one or more clusters comprise the dummy credential in order to be warmed up.

3. The system of claim 1, wherein the temporary security credential is set to be agnostic with respect to the workspace, the customer, or the tenant in which the virtual machine is deployed.

4. The system of claim 1, wherein the cluster is in a cluster pool, and each cluster in the cluster pool corresponds to a particular class selected from among a plurality of classes.

5. The system of claim 4, wherein each of the plurality of classes respectively corresponds to an environment for which a corresponding cluster is being maintained as a warmed-up cluster.

6. The system of claim 5, wherein each of the plurality of classes has a different configuration.

7. The system of claim 1, wherein the temporary security credential is replaced with the security credential associated with the customer based at least in part on a file update.

8. The system of claim 1, wherein allocating the virtual machine comprises configuring a network connection of the virtual machine, the network connection being configured to network infrastructure associated with the workspace, the customer, or the tenant.

9. The system of claim 1, wherein allocating the virtual machine comprises configuring the virtual machine using workspace-, customer-, or tenant-specific configurations.

10. The system of claim 9, wherein the workspace-, customer-, or tenant-specific configurations are comprised in a customer resource definition associated with the customer.

11. The system of claim 1, wherein the cluster comprises a default customer resource definition, and allocating the virtual machine comprises updating the default customer resource definition to correspond to a customer resource definition associated with the customer.

12. The system of claim 1, wherein the cluster is one of a plurality of clusters and wherein a first cluster of the plurality of clusters is unable to access a second cluster security credential of a second cluster of the plurality of clusters.

13. The system of claim 12, wherein the one or more processors are further configured to determine whether a first machine in a first cluster of the plurality of clusters has permissions to access a second security credential of a second machine in a second cluster of the plurality of clusters.

14. The system of claim 1, wherein allocating the virtual machine comprises enforcing a container within which the virtual machine operates with at least one other virtual machine, the container being enforced based at least in part on one or more security policies.

15. The system of claim 1, wherein instantiating a cluster comprises:
preloading a set of virtual machines of the cluster with one or more components that are to be used at run time.

16. The system of claim 1, wherein a software service communicates the request to allocate a cluster in response to a determination that additional capacity is needed to provide to a threshold level quality of service.

17. The system of claim 1, wherein allocating the cluster further comprises:
modifying infrastructure of the cluster to create a network connection with at least a node of the cluster.

18. The system of claim 1, wherein allocating the cluster further comprises:
modifying infrastructure of the cluster comprises configuring the cluster to connect a worker node comprised in the cluster to a driver node comprised in the cluster.

19. The system of claim 1, wherein allocating the cluster further comprises:
modifying infrastructure of the cluster to configure a network connection of the cluster to be able to communicate with a customer system.

20. The system of claim 1, further comprising:
predicting a usage of the workspace, a customer, or a tenant using a machine learning based model, the predicted usage indicative of an expected demand for a particular class of clusters, wherein receiving the request to allocate a cluster is responsive to determining that the predicted usage exceeds a current inventory of the particular class of clusters.

21. A method, comprising:
instantiating a plurality of clusters, wherein a cluster is a set of nodes that work together, wherein a node is one of a virtual machine or a computer wherein instantiating the plurality of clusters includes setting a temporary security credential for each virtual machine of one or more clusters of the plurality of clusters;
receiving a request to allocate a cluster associated with a workspace, a customer, or a tenant; and
in response to the request to allocate a cluster:
allocating a cluster from the plurality of clusters, wherein allocating the cluster comprises replacing the temporary security credential with a security credential of the cluster associated with the workspace, the customer, or the tenant.

22. A computer program product embodied in a non-transitory computer readable medium and comprising computer instructions for:
instantiating a plurality of clusters, wherein a cluster is a set of nodes that work together, wherein a node is one of a virtual machine or a computer, wherein instantiating the plurality of clusters includes setting a temporary security credential for each virtual machine of one or more clusters of the plurality of clusters;
receiving a request to allocate a cluster associated with a workspace, a customer, or a tenant; and
in response to the request to allocate a cluster:
allocating a cluster from the plurality of clusters, wherein allocating the cluster comprises replacing the temporary security credential with a security credential of the cluster associated with the workspace, the customer, or the tenant.

* * * * *